Jan. 22, 1963 D. N. LA BELLE 3,074,430
CONCENTRIC SELF-SEALING COUPLING
Filed Nov. 16, 1960 3 Sheets-Sheet 1
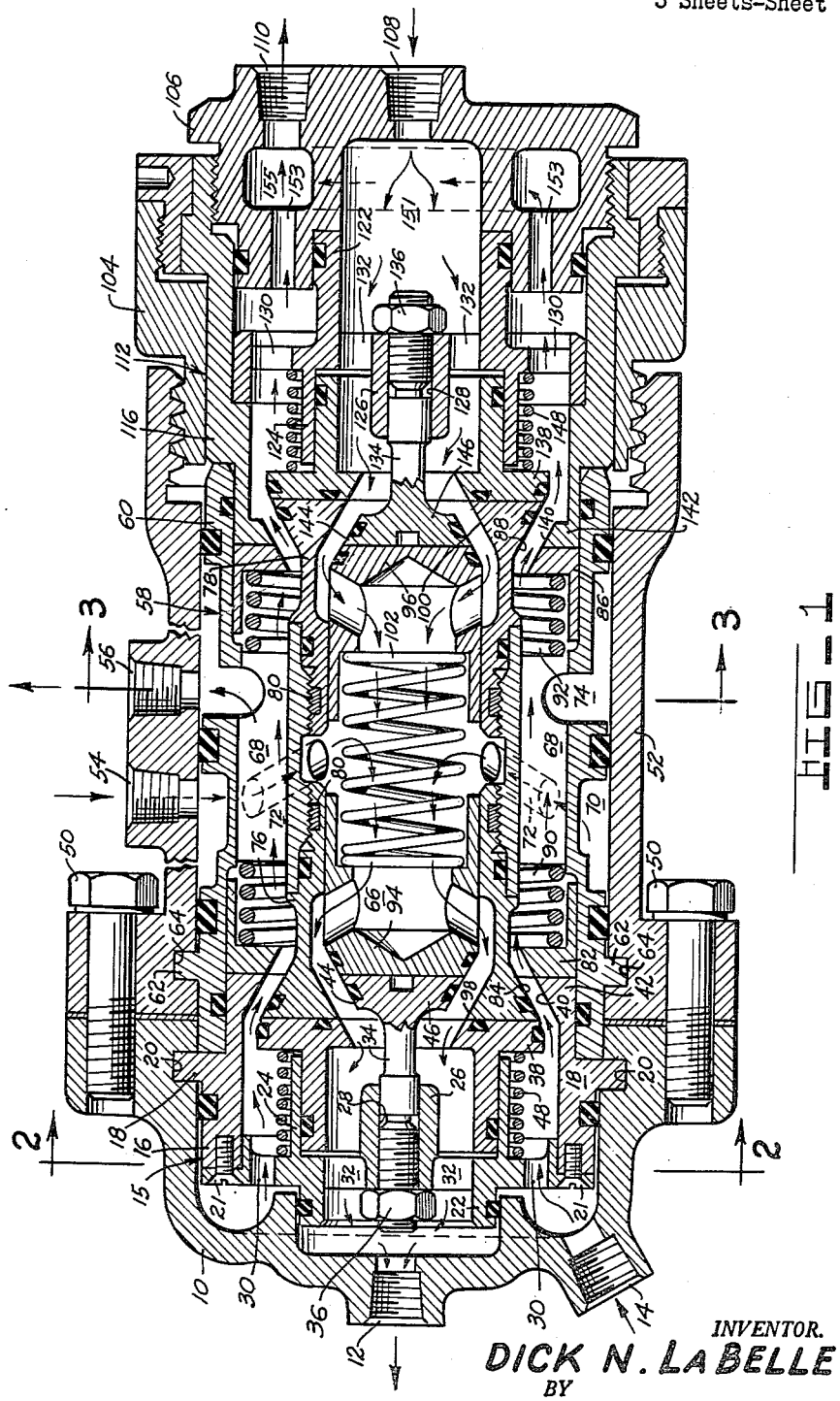
INVENTOR.
DICK N. LaBELLE
BY
William N. Antonis
ATTORNEY

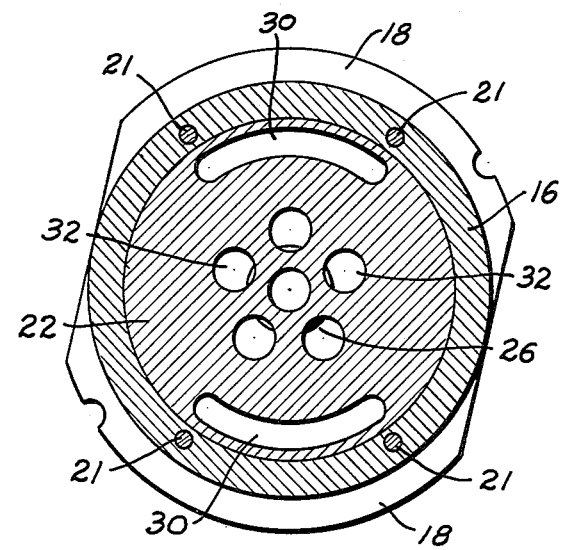
FIG_2
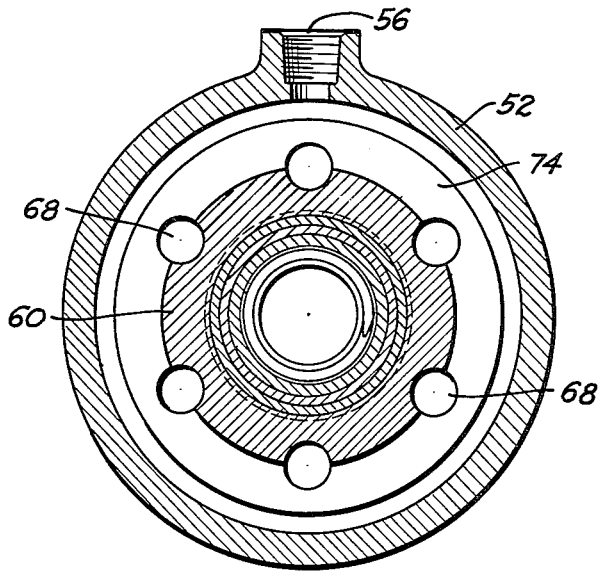
FIG_3
INVENTOR.
DICK N. LA BELLE.
BY
William N. Antone
ATTORNEY Jan. 22, 1963 D. N. LA BELLE 3,074,430
CONCENTRIC SELF-SEALING COUPLING
Filed Nov. 16, 1960 3 Sheets-Sheet 3
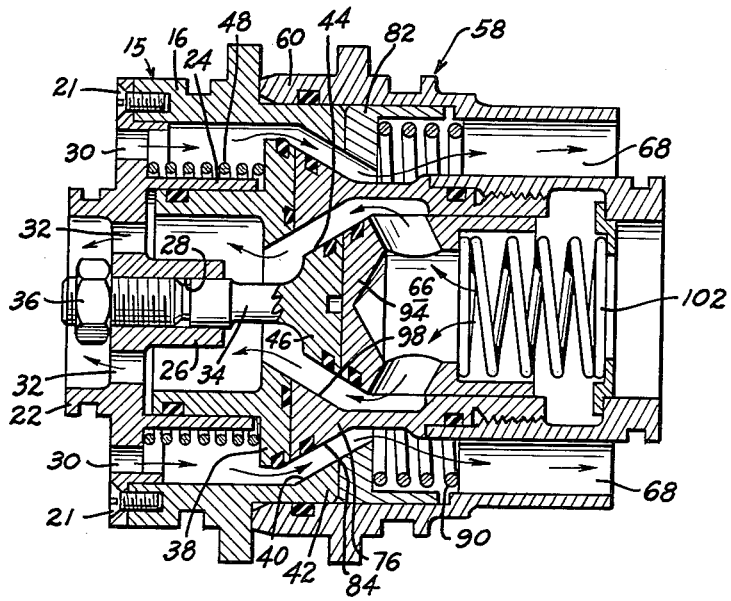
FIG_4
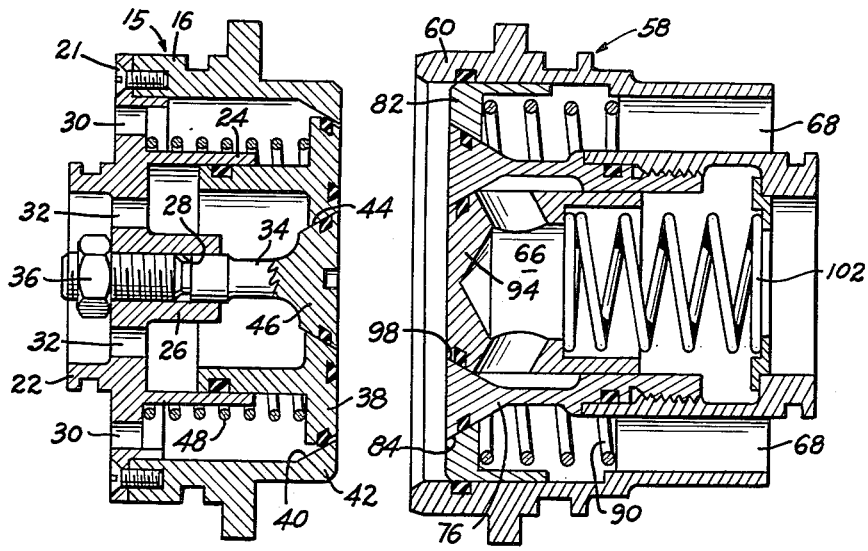
FIG_5
INVENTOR.
DICK N. LABELLE.
BY
William N. Antonio
ATTORNEY { # United States Patent Office 3,074,430
Patented Jan. 22, 1963

3,074,430
CONCENTRIC SELF-SEALING COUPLING
Dick N. La Belle, Sunnyvale, Calif., assignor to The Bendix Corporation, a corporation of Delaware
Filed Nov. 16, 1960, Ser. No. 69,669
4 Claims. (Cl. 137—595)

This invention relates to couplings and more particularly to concentric self-sealing couplings.

In the past, many fluid systems have utilized separate couplings and connectors for the fluid supply and return lines. Such systems have many drawbacks, but one of the foremost is the possibility of forgetting to engage the return line coupling and damaging the return side of the system by over-pressure.

Accordingly, it is an object of this invention to provide a single self-sealing coupling which will replace the separate couplings previously used in fluid supply and return lines.

Another object of this invention is to provide a self-sealing concentric coupling which is foolproof in the connection of the proper fluid lines to each other.

A further object of this invention is to provide a self-sealing concentric coupling which will alleviate the close tolerances required when mounting two separate couplings for a gang quick disconnect unit.

A still further object of this invention is to provide a concentric coupling which will automatically connect any two fluid systems for the purpose of flowing a fluid in and out of the connected systems.

Another object of this invention is to provide a self-sealing coupling which prevents the trapping of air in the system or fluid leakage during coupling or uncoupling of the fluid lines.

Another object of this invention is to provide a concentric coupling having male and female units, each of which includes valve means located therein, wherein all valve means open and close simultaneously when the male and female units are coupled or uncoupled.

More specifically, it is an object of this invention to provide a concentric coupling which utilizes a common poppet valve in the male or female unit for simultaneously opening or closing the concentric unconnected fluid flow passages extending therethrough.

A further object of this invention is to provide a dual input single output concentric coupling for use in any fluid system which utilizes one input for testing and the other input during actual operation.

The above and other objects and features of the invention will become apparent from the following description of the mechanism taken in connection with the accompanying drawings which form a part of this specification, and in which:

FIGURE 1 is a sectional view of a dual input single output concentric self-sealing coupling;

FIGURE 2 is a sectional view taken along line 2—2 of FIGURE 1 with the outer housing removed;

FIGURE 3 is a sectional view taken along line 3—3 of FIGURE 1;

FIGURE 4 is a sectional view of a single input single output concentric self-sealing coupling showing the male and female connector members in their connected or coupled positions, said members being removed from any suitable locking structure required to maintain the members in a coupled position; and FIGURE 5 is a sectional view showing the male and female connector members of FIGURE 4 prior to being connected or coupled.

Referring to FIGURE 1, numeral 10 designates an end portion of a housing having a first port 12 for directing fluid to a servo system or load and a second port 14 for receiving fluid from said servo system or load. Located within the housing is a male coupling unit 15 having an outer shell 16 which is fixedly connected to the housing by suitably revolving the shell so that the flange-like bayonet inserts 18 extending therefrom are locked within grooves 20. Fixedly connected to the shell 16 by suitable means, such as screws 21, is a body member 22 having a sleeve-like extension 24 and a boss 26 in which is located a threaded bore 28. Two slots 30 are located between the sleeve-like extension 24, and the screws 21, while a plurality of drilled holes 32 are located between the sleeve-like extension and the boss 26, for reasons to be subsequently explained. A center post 34 is threaded into bore 28 and is locked in position by lock nut 36. Located between the outer shell 16 and the center post 34 is a movable annular valve member 38, the outer periphery of which is seatable on an annular valve seat 40 formed on an inwardly extending flange 42 of outer shell 16 and the inner periphery of which is seatable on an annular valve seat 44 formed on an outwardly extending flange 46 of the center post 34. A coil spring 48 opposes movement of the valve member 38.

Suitably connected to the end portion of the housing, by means such as bolts 50, is a central portion 52 having two ports 54 and 56, the first of which communicates with a pump or high pressure supply (not shown) and the second of which communicates with a reservoir or low pressure return (not shown). Located within the central portion of the housing is a double female coupling unit 58 having a stationary outer body 60 which is fixedly connected to the central portion 52 of the housing by suitably turning the body so that flange-like bayonet inserts 62 extending therefrom are locked within grooves 64. The outer body 60 contains a central bore 66, a plurality of axially drilled passages 68 surrounding said bore, an annular groove 70 communicating with pump port 54, a plurality of drilled semi-radial passages 72 for communicating the annular groove 70 with the central bore 66, and an annular groove 74 for communicating the reservoir port 56 with the drilled passages 72. A pair of stationary inner rings 76 and 78, which serve as fluid dividers, are threaded into opposite ends of central bore 66 and are locked in position through suitable means such as nylon inserts 80. A first annular valve member 82 is seatable on an annular valve seat 84 formed on stationary inner ring 76 while a second similar annular valve member 86 is seatable on an annular valve seat 88 formed on stationary inner ring 78. Movement of annular valve members 82 and 86 is opposed by coil springs 90 and 92 respectively. Located within the stationary inner rings 76 and 78 are a pair of hollow piston-like valve members 94 and 96, the first of which is seatable on annular valve seat 98 formed on the stationary inner ring 76 and the second of which is seatable on annular valve seat 100 formed on the stationary ring 78. A single coil spring 102 is used to oppose movement of both of the valve members 94 and 96.

Connected to the central portion 52 of the housing by any suitable means, such as by a multiple lead quick disconnect mechanism 104, is the other end portion 106 of the housing which contains a port 108 communicating with a high pressure source and a port 110 communicating with a low pressure source. Located at this end of the housing is a male coupling unit 112 which is essentially identical with the male coupling member 15, located at the other end. Thus, male coupling unit 112 includes an outer shell 116 which is threadedly connected to the housing, a body member 122 having a sleeve-like extension 124 and a boss 126 in which is located a threaded bore 128. Two slots 130 and a plurality of drilled holes 132 are located in body member 122 for reasons to be subsequently explained. A center post 134 is threaded into bore 128 and is locked in position by lock nut 136. Located between the outer shell 116 and the center post 134 is a movable annular valve member 138, the outer periphery of which is seatable on an annular valve seat 140 formed on an inwardly extending flange 142 of outer shell 116 and the inner periphery of which is seatable on an annular valve seat 144 formed on an outwardly extending flange 146 of the center post 134. A coil spring 148 opposes movement of the valve member 138. Port 108 communicates with holes through means of chamber 151 while port 110 communicates with slots 130 through means of drilled holes 153 and annular passage 155.

One application of the concentric self-sealing coupling, shown in FIGURE 1, would be in connection with the servo system of a missile. Thus, it can be seen that ports 12 and 14 could be attached to a servo system, while ports 54 and 56 could be suitably connetced to the missile's own turbo power system. The ports 108 and 110 could then be suitably connected to an external fluid power supply located at a test stand. Pre-flight testing of a missile servo system, such as the wing servos, could be accomplished by directing high pressure fluid through the central passage of the coupling to the wing servos via ports 108 and 12, as indicated by the arrows, and permitting return of low pressure fluid from the wing servos through the surrounding annular passage of the coupling via ports 14 and 110, as indicated by the arrows. If the servos are functioning properly, the male coupling unit 112 is removed along with the quick disconnection mechanism 104. Upon removal of the male or external connector coupling 112, annular valve member 86 will seat on annular valve seat 88, thereby closing off one end of the annular passage. Likewise, valve member 96 will seat on valve seat 100 thereby closing off one end of the central passage. It will be noted that all of the valves in the male and female couplings are self-sealing. This makes possible the separation of the power system from the servo system of the missile without loss of hydraulic fluid or the inclusion of air, or the removal of external supply components after operational test without loss of hydraulic fluid or inclusion of air. After the male coupling unit 112 has been removed, a protective endcap may be suitably attached to the end of the central position 52 of the housing. During actual flight, fluid flow will be from the pump to the wing servos via port 54, drilled passages 72, central passage 66 and port 12, as indicated by the arrows. Return flow will be from the wing servos to a reservoir via ports 14 and 56, as indicated by the arrows.

Obviously, the same basic coupling, which is shown in FIGURE 1 as a dual input single output concentric coupling for use in connection with missiles, aircraft, or other fluid power systems, could be converted to a single input single output concentric coupling, as shown in FIGURES 4 and 5, for use in other areas which do not require a dual input. This is accomplished by utilizing only one male and one female coupling instead of two sets of each. No outside housing or locking structures have been shown in FIGURES 4 and 5, since they can be varied, depending on the use to which the coupling is being put, without affecting my novel coupling arrangement.

Since the components of the coupling shown in FIGURES 4 and 5 are identical and function in the same manner as those shown in FIGURE 1, the same numerals will be applied thereto. Flow through central and annular passages could be as indicated by the arrows. Such a coupling could be used in tractor hydraulic supply systems, for coolants in atomic reactors, or even in refueling operations where the male and female couplings are operatively connected to refueling hoses. Thus, the central passage of the coupling could be used to pass fuel while the outer annular passage could be used to vent the air in the tank. If the tank is filled up, the extra fuel could be returned through the outside passage, thereby eliminating overflow problems.

Although this invention has been described in connection with certain specific embodiments, it will be obvious to those skilled in the art that various changes may be made in the form, structure and arrangement of parts without departing from the spirit of the invention. Likewise, other applications and uses will readily occur to persons skilled in the art. Accordingly, applicant does not desire to be limited to the specific embodiments disclosed herein primarily for purposes of illustration, but instead, desires protection falling within the scope of the appended claims.

Having thus described the various features of the invention, what I claim as new and desire to secure by Letters Patent is:

1. In a concentric coupling having first and second connector members each of which include a central fluid passage and a concentric fluid passage, a first male connector member comprising a fixed outer ring on which is formed a first conical valve seat, a fixed center post on which is formed a second conical valve seat, an annular poppet valve, the outer periphery of which is conical and seatable on said first valve seat for closing off the concentric fluid passage and the inner periphery of which is conical and seatable on said second valve seat for closing off the central fluid passage, and means for urging said annular poppet valve towards said first and second valve seats, a second female connector member comprising a fixed outer body for receiving the male connector member, a fixed annular fluid divider having a third conical valve seat formed on the outer periphery thereof and a fourth conical valve seat formed on the inner periphery thereof, a second annular poppet valve having a conical surface which is seatable on said third valve seat for closing off the concentric fluid passage, means for urging said second annular poppet valve towards said third valve seat, a third poppet valve having a conical surface which is seatable on said fourth valve seat for closing off the central fluid passage, means for urging said third poppet valve towards said fourth valve seat, said first, second and third poppet valves being simultaneously moved to an open position by the fluid divider, outer ring and center post respectively when the connector members are brought into operative relation, and means for locking the connector members in said operative relation.

2. A concentric coupling as defined in claim 1 wherein the annular poppet valve of said male connector member and the annular fluid divider of said female connector member are in face to face contact and have a face type seal therebetween for preventing flow between said central and concentric fluid passages.

3. A concentric coupling comprising first, second and third connector members each having a central fluid passage and a concentric fluid passage, said first connector member having first valve means at one end thereof for closing off one end of the central and concentric fluid passages therein and second valve means at the other end thereof for closing off the other end of said central and concentric fluid passages, said second and third connector members each having valve means only at one end thereof for closing off the central and concentric fluid passages formed therein, means located in each of said connector members for urging each of said valve means towards a closed position, means for opening the valve means in each of said connector members when the connector members are brought into operative relation, means for locking the connector members in said operative relation, a pair of ports located in said first connector member, one of said ports communicating with said central passage at a point between the first and second valve means located in said first connector member, and the other of said ports communicating with said concentric passage at a point between the first and second valve means located in said first connector member, and a pair of ports located in each of the remaining two connector members, one of which communicates with said central passage and the other of which communicates with said concentric passage.

4. A concentric coupling comprising a first double end female connector member having central and concentric fluid passages therein, and second and third male connector members each having central and concentric fluid passages therein, said first connector member comprising a fixed outer body for receiving one of said male connector members at one end thereof and the other of said male connector members at the other end thereof, a first fixed annular fluid divider located at one end thereof, a second fixed annular fluid divider located at the other end thereof, said first and second fluid dividers each having a first valve seat formed on the outer periphery thereof and a second valve seat formed on the inner periphery thereof, first and second annular poppet valves, the first of which is seatable on the first valve seat of said first fluid divider for closing off the concentric fluid passage at one end and the second of which is seatable on the first valve seat of said second fluid divider for closing off the concentric fluid passage at the other end, means for urging said first and second annular poppet valves against their respective valve seats, third and fourth poppet valves, said third valve being seatable on the second valve seat of said first fluid divider for closing off the central fluid passage at one end and said fourth valve being seatable on the second valve seat of said second fluid divider for closing off the central fluid passage at the other end, means for urging said third and fourth poppet valves against their respective valve seats, said second and third male connector members each comprising a fixed outer ring on which is formed a first valve seat, a fixed center post on which is formed a second valve seat, an annular poppet valve the outer periphery of which is seatable on said first valve seat for closing off the concentric fluid passage and the inner periphery of which is seatable on said second valve seat for closing off the central fluid passage, and means for urging said annular poppet valve towards its associated valve seats, said first and third poppet valves of one end of said female connector member and the annular poppet valve of the mating male connector member being simultaneously moved to an open position by the outer ring and center post of said mating male connector member and the first fluid divider of said female connector member respectively when the connector members are brought into operative relation, said second and fourth poppet valves of the other end of said female connector member and the annular poppet valve of the mating male connector member being simultaneously moved to an open position by the outer ring and center post of said mating male connector member and the second fluid divider of said female connector member respectively when the connector members are brought into operative relation, means for locking the respective connector members in said operative relations, a pair of ports located in said female connector member, one of said ports communicating with said concentric fluid passage at a point between said first and second annular poppet valves located therein and the other of said ports communicating with said central fluid passage at a point between said third and fourth poppet valves located therein, and a pair of ports located in each of said male connector members, one of which communicates with said concentric passage and the other of which communicates with said central passage.

References Cited in the file of this patent
UNITED STATES PATENTS
2,436,206    Deming _____ Feb. 17, 1948
FOREIGN PATENTS
214,337    Australia _____ Apr. 1, 1958